(12) United States Patent
Croak et al.

(10) Patent No.: US 7,613,113 B1
(45) Date of Patent: Nov. 3, 2009

(54) METHOD AND APPARATUS FOR INTRODUCING A DELAY DURING A CALL SETUP IN A COMMUNICATION NETWORK

(75) Inventors: Marian Croak, Fair Haven, NJ (US);
Hossein Eslambolchi, Los Altos Hills, CA (US)

(73) Assignee: AT&T Corp., New York, NY (US)

( * ) Notice: Subject to any disclaimer, the term of this patent is extended or adjusted under 35 U.S.C. 154(b) by 215 days.

(21) Appl. No.: 11/239,759

(22) Filed: Sep. 30, 2005

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)

(52) U.S. Cl. .................. 370/230; 370/232; 370/260; 370/261; 370/395.2; 455/414.1; 455/416; 379/201.01; 379/202.01

(58) Field of Classification Search .................. 370/230, 370/232, 395.2, 260, 261; 455/414.1, 416; 379/201.01, 202.01
See application file for complete search history.

(56) References Cited

U.S. PATENT DOCUMENTS

| | | | | |
|---|---|---|---|---|
| 6,333,931 | B1 * | 12/2001 | LaPier et al. | 370/385 |
| 6,845,155 | B2 * | 1/2005 | Elsey | 379/266.04 |
| 6,977,899 | B1 * | 12/2005 | Matragi et al. | 370/237 |
| 2003/0174652 | A1 * | 9/2003 | Ebata | 370/235 |
| 2005/0226219 | A1 * | 10/2005 | Casey et al. | 370/352 |

OTHER PUBLICATIONS

Pillai, "A Distributed Overload Control Algorithm for Delay-Bounded Call Set Up".*

* cited by examiner

*Primary Examiner*—Quynh H Nguyen

(57) ABSTRACT

A method and apparatus for providing a capability for placing a slight delay in processing call setup and termination signaling messages in conferencing applications so that the call processing rate requirement on a Call Control Element (CCE) is lowered. For example, allowing conferencing participants of a conference call to join a conference bridge over a 90 second period will significantly improve the processing load on the CCE than allowing them to join in over a 30 second period. In one embodiment, the present invention introduces a configurable delay in the processing of signaling messages for call setups and terminations for high volume calls onto conference bridges.

3 Claims, 4 Drawing Sheets

METHOD AND APPARATUS FOR INTRODUCING A DELAY DURING A CALL SETUP IN A COMMUNICATION NETWORK

The present invention relates generally to communication networks and, more particularly, to a method and apparatus for introducing a delay during a call setup in a communication network, e.g., a packet network such as a Voice over Internet Protocol (VoIP) network.

BACKGROUND OF THE INVENTION

Call set up rates in telephony networks can vary considerably depending upon particular applications. Conferencing applications that have a large number of participants can generate very high call set up rates, in terms of the number of calls per second, because many simultaneous calls can be originated, established, and terminated in a very short period of time. To handle this surge in simultaneous call setups and terminations, Call Control Element (CCE) with additional processing capacity has to be deployed. This eventually leads to significantly higher capital costs. However, if a surge in call setup and terminations can be spread out in time, the call processing capacity required to handle the surge will be significantly lower.

Therefore, a need exists for a method and apparatus for introducing a delay during a call setup in a packet network, e.g., a VoIP network.

SUMMARY OF THE INVENTION

In one embodiment, the present invention enables a capability for placing a slight delay in processing call setup and termination signaling messages in conferencing applications so that the call processing rate requirement on a Call Control Element (CCE) is lowered. For example, allowing conferencing participants of a conference call to join a conference bridge over a 90 second period will significantly improve the processing load on the CCE than allowing them to join in over a 30 second period. For instance, if 900 participants are joining a conference bridge at the same time, the processing load over a 90 second period is only 10 calls per second. However, the processing load will increase to 30 calls per second if the call setups are spread out over a 30 second period instead. In one embodiment, the present invention introduces a configurable delay in the processing of signaling messages for call setups and terminations for high volume calls onto conference bridges. When a call processing delay is appropriately introduced over a properly configured period of time, the required processing capacity on a CCE can be significantly reduced to avoid the high capital costs involved in upgrading the CCE capable of processing a much higher call processing capacity.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
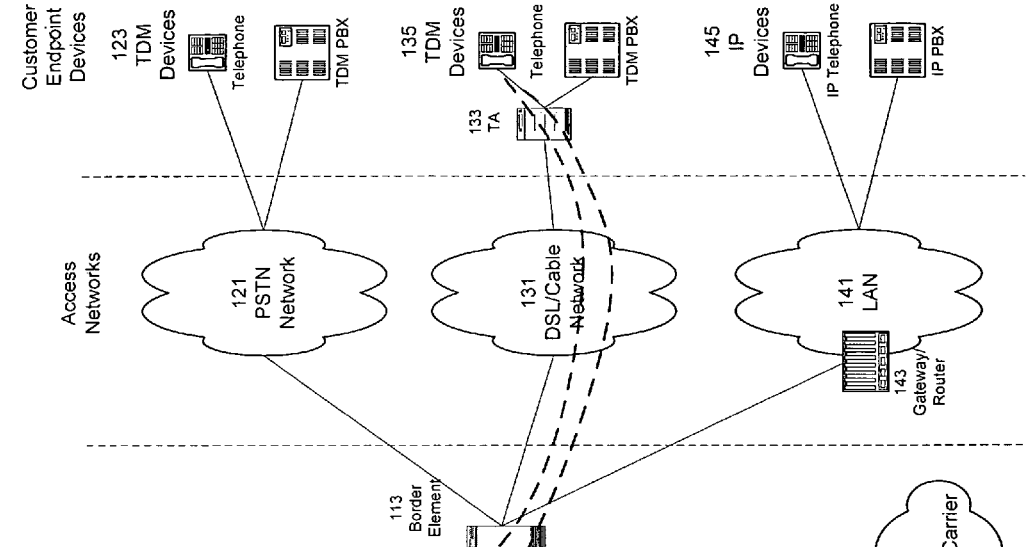
FIG. 1 illustrates an exemplary Voice over Internet Protocol (VoIP) network 100 related to the present invention.

To better understand the present invention, FIG. 1 illustrates an example network 100, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Call set up rates in telephony networks can vary considerably depending upon particular applications. Conferencing applications that have a large number of participants can generate very high call set up rates, in terms of the number of calls per second, because many simultaneous calls can be originated, established, and terminated in a very short period of time. To handle this surge in simultaneous call setups and terminations, Call Control Element (CCE) with additional processing capacity has to be deployed. This eventually leads to significantly higher capital costs. However, if a surge in call setup and terminations can be spread out in time, the call processing capacity required to handle the surge will be significantly lower.

To address this need, the present invention provides a capability for placing a slight delay in processing call setup and termination signaling messages in conferencing applications so that the call processing rate requirement on a Call Control Element (CCE) is lowered. For example, allowing conferencing participants of a conference call to join a conference bridge over a 90 second period will significantly improve the processing load on the CCE than allowing them to join in over a 30 second period. For instance, if 900 participants are joining a conference bridge at the same time, the processing load over a 90 second period is only 10 calls per second. However, the processing load will increase to 30 calls per second if the call setups are spread out over a 30 second period instead. The present invention introduces a configurable delay in the processing of signaling messages for call setups and terminations for high volume calls onto conference bridges. When a call processing delay is appropriately introduced over a properly configured period of time, the required processing capacity on a CCE can be significantly reduced to avoid the high capital costs involved in upgrading the CCE capable of processing a much higher call processing capacity.

Figure 2:
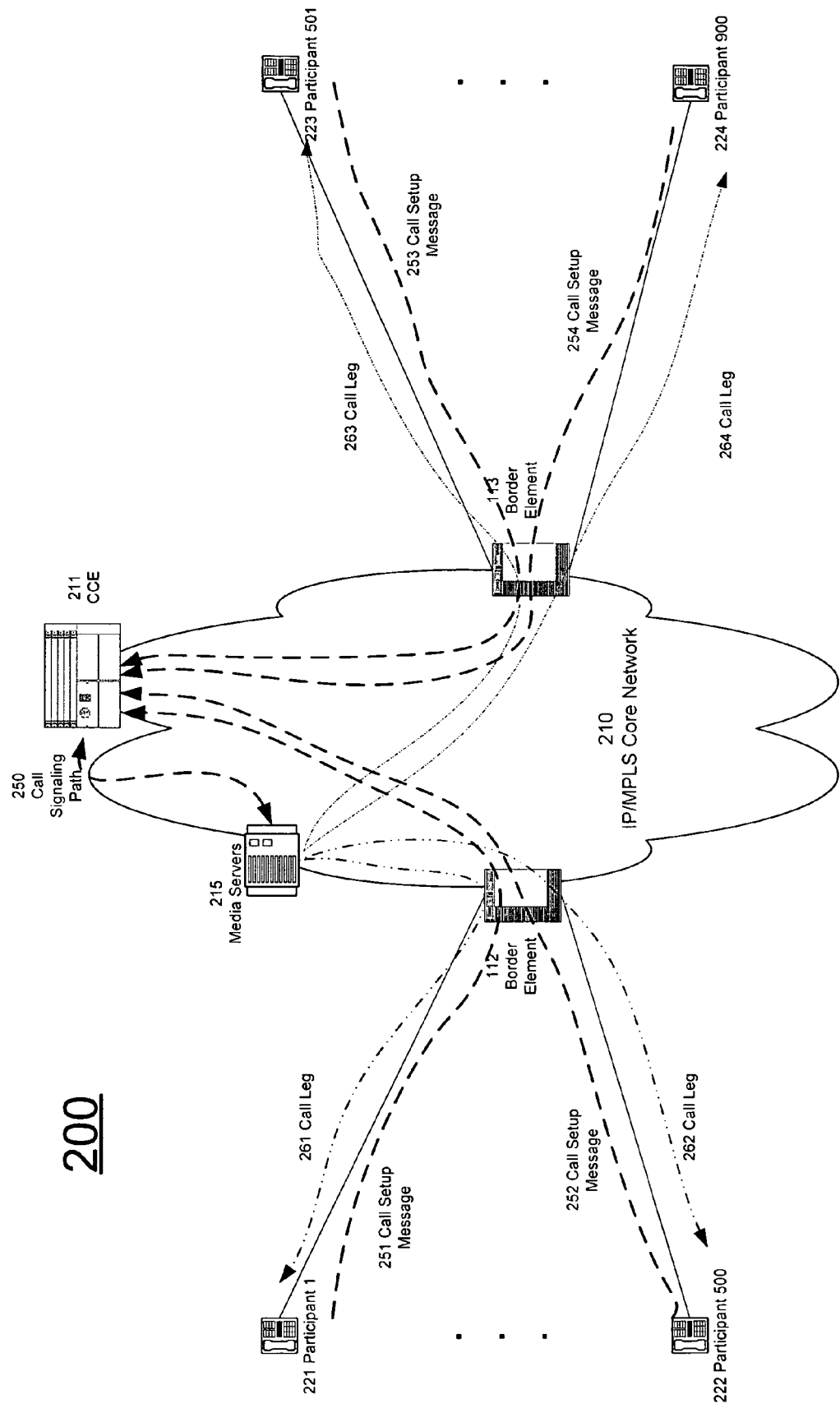
FIG. 2 illustrates an example of introducing delay during call setup in a VoIP network related to the present invention.

FIG. 2 illustrates an exemplary communication architecture 200 for introducing a delay during a call setup in a packet network 210, e.g., a VoIP network related to the present invention. In FIG. 2, participant 221 is a conference call participant number 1, participant 222 is a conference call participant number 500, participant 223 is a conference call participant number 501, and participant 224 is a conference call participant number 900. There are a total of 900 conference call participants but only four of them are shown in FIG. 2 for simplicity reason. Assuming all 900 participants call into the same conference bridge at the same time. For instance, for the four participants shown in FIG. 2, participant 221 calls into the conference bridge using signaling flow 251, participant 222 calls into the conference bridge using signaling flow 252; participant 223 calls into the conference bridge using signaling flow 253, and participant 224 calls into the conference bridge using signaling flow 254 all at the same time. This poses a heavy call volume to CCE 211 that receives 900 call setup messages at the same time.

In one embodiment of the present invention, in order to reduce the call processing load on CCE 211, the 900 received calls are to be processed uniformly over a predefined period of time instead, such as 90 seconds. The predefined period of time is a configurable parameter set by the network operator. All 900 incoming call setup messages are initially queued and waiting to be processed. The call setup message from participant 221 is the first call setup to be processed, the call setup message from participant 222 is the 500th call setup to be processed, the call setup message from participant 223 is the 501st call setup to be processed, and the call setup message from participant 224 is the 900th call setup to be processed. Therefore, the 900 call setups are spread out over 90 seconds with a 100 ms time delay introduced in between the beginning of each consecutive call setup message to be processed. At time T=0 second, the call setup message from participant 221 will be processed and will be completed shortly after at time T=0+d1, where d1 is the processing time required to finish processing the call setup message for participant 221. It should be noted that the CCE will not be allowed to process the second call set up message for the same conference call until the time period of T=0.1 second. In other words, the time period between T=0+d1 and T=0.1 second, the CCE is allowed to process other calls before returning to handle the second call set up message for the same conference call at T=0.1 second.

Similarly, at T=49.9 seconds, the call setup message from participant 222 will be processed and will be completed shortly after at time T=49.9+d500, where d500 is the processing time required to finish processing the call setup message for participant 222. Similarly, at T=50.0 seconds, the call setup message from participant 223 will be processed and will be completed shortly after at time T=50.0+d501, where d501 is the processing time required to finish processing the call setup message for participant 223. At T=89.9 seconds, the call setup message from participant 224 will be processed and will be completed shortly after at time T=89.9+d900, where d900 is the processing time required to finish processing the call setup message for participant 224. Note that the processing time required to finish processing a call setup message, such as d1, d500, d501, or d900, is usually smaller than the artificially introduced time delay between each call setup message. Therefore, at T=0+d1, the setup of call leg 261 of the conference call will have been completed. Similarly, at T=49.9+d500, the setup of call leg 262 of the conference call will have been completed. At T=50.0+d501, the setup of call leg 263 of the conference call will have been completed. At T=89.9+d900, the setup of call leg 264 of the conference call will have been completed. In order to setup each of the call leg of the conference, CCE 211 has to communicate with MS 215 using signaling flow 250. MS 215 provides the conference bridge function to support conference call applications.

Figure 3:
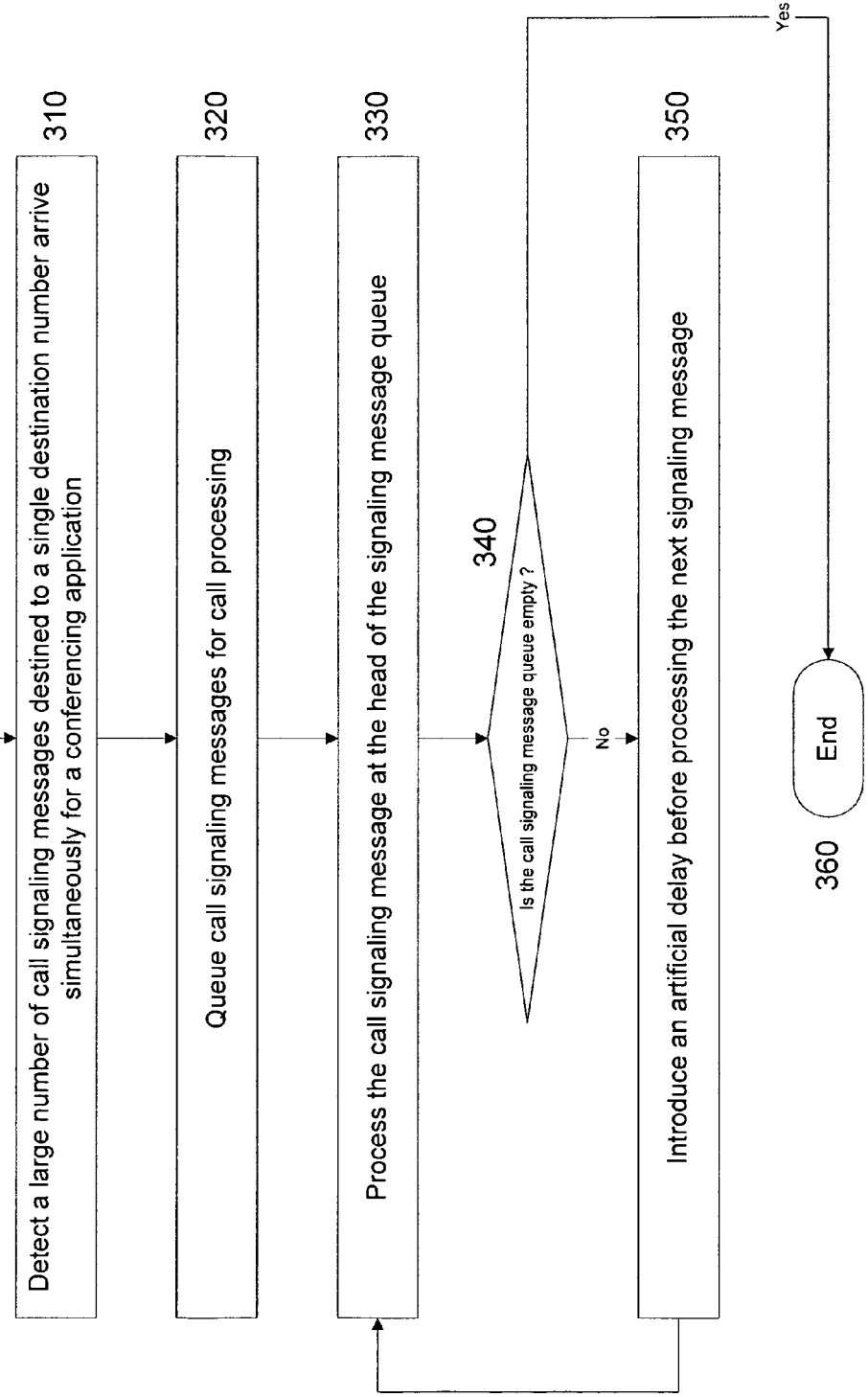
FIG. 3 illustrates a flowchart of a method for introducing delay during call setup in a VoIP network of the present invention.

FIG. 3 illustrates a flowchart of a method 300 for introducing delay during call setup in a packet network, e.g., a VoIP network of the present invention. Method 300 starts in step 305 and proceeds to step 310.

In step 310, the method detects that a large number of call signaling messages arriving simultaneously, or in a short period of time, from participants of a conference call to a single destination phone number and that the call signaling message arrival rate has exceeded a predefined threshold. The predefined call signaling message arrival rate is determined by dividing the number of arrived call signaling messages destined to a single destination number within a predefined time interval by the predefined time interval. The predefined call signaling message arrival rate threshold and the predefined time interval parameter are configurable parameters set by the network operator. For example, the predefined call signaling message arrival rate threshold can be generated in accordance with the processing capability of a CCE. In other words, the predefined call signaling message arrival rate threshold can configured in accordance with the capability of a particular CCE in processing the volume of call set up messages.

In step 320, the method queues all the incoming call setup messages to be processed. In one embodiment, the incoming call setup messages can be stored in the order that they arrive.

In step 330, the method processes the call setup message at the head of the signaling message queue, e.g., processing signaling message destined to a single phone number based on the order that they arrive.

In step 340, the method checks if the signaling message queue is empty. If the queue is empty, the method proceeds to step 360; otherwise, the method proceeds to step 350.

In step 350, the method introduces a predefined time delay before processing the next call setup message. In one embodiment of the present invention, the delay introduced can simply be equal to:

(the number of call legs to be setup/a predefined period of time in which the setup of all the call legs to be completed)

The predefined period of time is a configurable parameter set by the network provider, which can be introduced by the CCE. In another embodiment of the present invention, the delay introduced can simply be a fixed time period parameter that is configurable by the network provider taking into account the capability of the pertinent CCE that is tasked with processing the call set up messages. The method ends in step 360.

Figure 4:
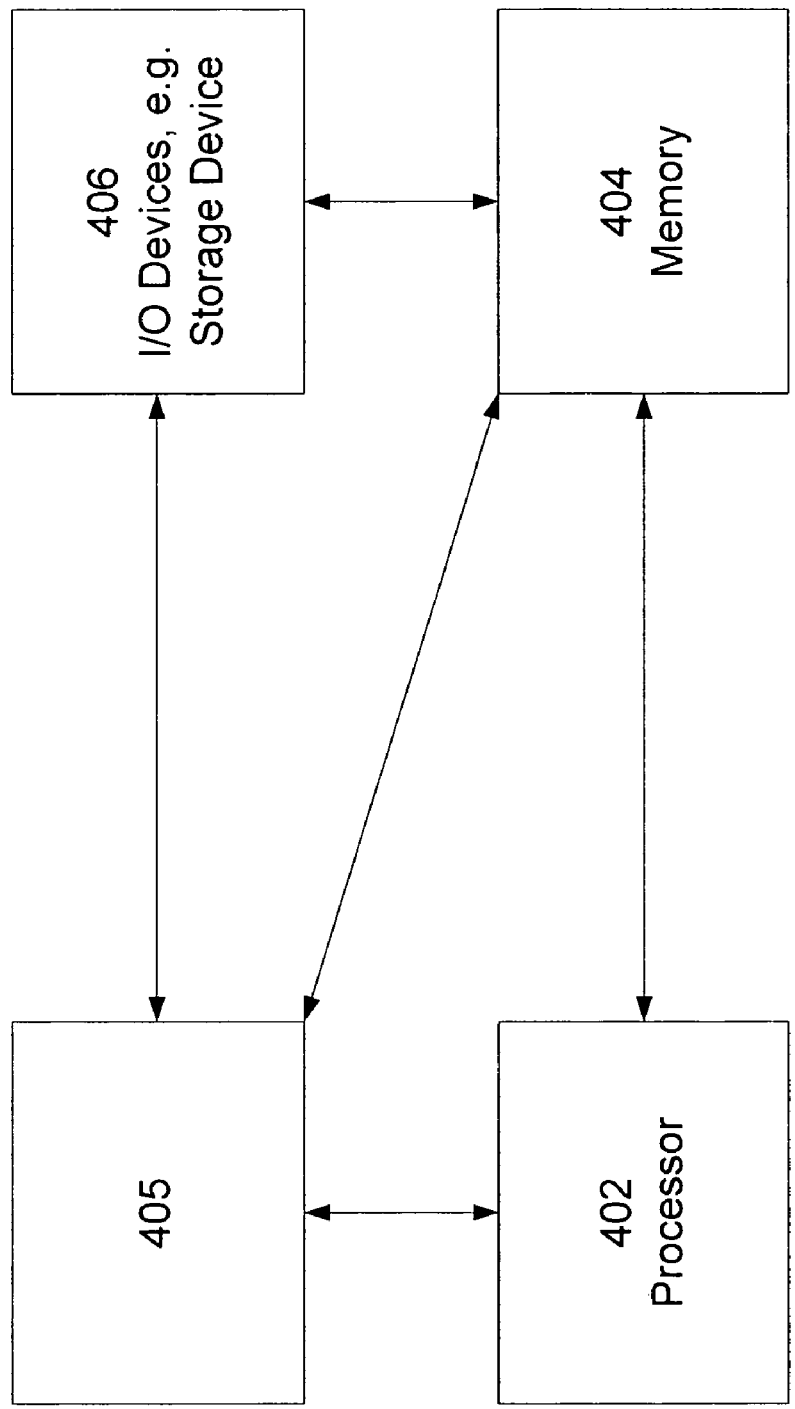
FIG. 4 illustrates a high level block diagram of a general purpose computer suitable for use in performing the functions described herein.

FIG. 4 depicts a high level block diagram 400 of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for introducing a delay during call setup, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for introducing a delay during call setup can be loaded into memory 404 and executed by processor 402 to implement the functions as discussed above. As such, the present process 405 for introducing a delay during call setup (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for introducing a delay during a call set up in a communication network, comprising:

detecting a call signaling message arrival rate threshold has been exceeded for a call set up; and if said call signaling message arrival rate threshold has been exceeded for said call set up, then introducing a configurable delay by a Call Control Element (CCE) between each of a plurality of incoming call signaling messages destined to a single phone number associated with said call set up, wherein said introducing said configurable delay between each of a plurality of incoming call signaling messages comprises:

introducing said configurable delay between a start of processing of each of said plurality of incoming call signaling messages destined to said single phone number, wherein said configurable delay is determined by a number of call legs to be setup to said single phone number divided by a predefined period of time in which the setup of all the call legs is to be completed.

2. A computer-readable storage medium having stored thereon a plurality of instructions, the plurality of instructions including instructions which, when executed by a processor, cause the processor to perform the steps of a method for introducing a delay during a call set up in a communication network, comprising:

detecting a call signaling message arrival rate threshold has been exceeded for a call set up; and if said call signaling message arrival rate threshold has been exceeded for said call set up, then introducing a configurable delay by a Call Control Element (CCE) between each of a plurality of incoming call signaling messages destined to a single phone number associated with said call set up, wherein said introducing said configurable delay between each of a plurality of incoming call signaling messages comprises:

introducing said configurable delay between a start of processing of each of said plurality of incoming call signaling messages destined to said single phone number, wherein said configurable delay is determined by a number of call legs to be setup to said single phone number divided by a predefined period of time in which the setup of all the call legs is to be completed.

3. An apparatus for introducing a delay during a call set up in a communication network, comprising:

means for detecting a call signaling message arrival rate threshold has been exceeded for a call set up; and a Call Control Element (CCE) for introducing a configurable delay between each of a plurality of incoming call signaling messages destined to a single phone number associated with said call set up if said call signaling message arrival rate threshold has been exceeded for said call set up, wherein said introducing said configurable delay between each of a plurality of incoming call signaling messages comprises:

introducing said configurable delay between a start of processing of each of said plurality of incoming call signaling messages destined to said single phone number, wherein said configurable delay is determined by a number of call legs to be setup to said single phone number divided by a predefined period of time in which the setup of all the call legs is to be completed.

* * * * *